(12) United States Patent
Xia et al.

(10) Patent No.: US 11,829,585 B2
(45) Date of Patent: Nov. 28, 2023

(54) EMBEDDED PRODUCT, METHOD FOR DISPLAYING EMBEDDED PRODUCT INFORMATION AND COMPUTER READABLE MEDIUM

(71) Applicant: ARRIS Enterprises LLC, Suwanee, GA (US)

(72) Inventors: Xiaojian Xia, Guangdong (CN); Lidan Chen, Guangdong (CN); Hong Zhou, Shenzhen (CN); Hua Wen, Guangdong (CN); Li Wang, Guangdong (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/470,132

(22) Filed: Sep. 9, 2021

(65) Prior Publication Data
US 2022/0113850 A1 Apr. 14, 2022

(30) Foreign Application Priority Data
Oct. 9, 2020 (CN) .......................... 202011073082.4

(51) Int. Cl.
*G06F 3/0484* (2022.01)
*G06F 9/54* (2006.01)
(Continued)

(52) U.S. Cl.
CPC ............ *G06F 3/0484* (2013.01); *G06F 9/451* (2018.02); *G06F 9/541* (2013.01); *G06Q 10/20* (2013.01); *G06Q 30/016* (2013.01)

(58) Field of Classification Search
None
See application file for complete search history.

(56) References Cited

U.S. PATENT DOCUMENTS

2004/0249849 A1* 12/2004 Mordkovich ............. G06F 8/38
  707/999.102
2004/0261116 A1* 12/2004 Mckeown ........... H04L 12/2856
  725/109

(Continued)

OTHER PUBLICATIONS

The Linux Documentation Project (Non-patent Literature), pertinent for disclosing what output redirection is (p. 1). (Year: 2019).*

*Primary Examiner* — William L Bashore
*Assistant Examiner* — Gabriel Mercado
(74) *Attorney, Agent, or Firm* — Wenderoth, Lind & Ponack, L.L.P.

(57) ABSTRACT

The present disclosure relates to an embedded product, a method of displaying the debugging information of the embedded product, and a computer readable medium. The embedded product comprises a general CLI library containing one or a plurality of CLI commands for the embedded product, wherein at least some commands in the general CLI library are mapped to a debugging GUI, and the embedded product further comprises: a memory having instructions stored thereon; a processor configured to execute the instructions stored on the memory to cause the processor to carry out the following operations: receiving a request for information about the embedded product in response to a click on a page element on the debugging GUI; obtaining the requested embedded product information from the general CLI library; and receiving the obtained information about the requested embedded product and displaying the information on the debugging GUI.

20 Claims, 8 Drawing Sheets

(51) Int. Cl.
*G06F 9/451* (2018.01)
*G06Q 30/016* (2023.01)
*G06Q 10/20* (2023.01)

(56) References Cited

U.S. PATENT DOCUMENTS

| | | | |
|---|---|---|---|
| 2012/0117542 A1* | 5/2012 | Bates | G06F 8/71 |
| | | | 717/125 |
| 2012/0239916 A1* | 9/2012 | Malasani | H04L 41/0806 |
| | | | 713/1 |
| 2013/0031420 A1* | 1/2013 | Haverkamp | G06F 11/3656 |
| | | | 714/45 |
| 2013/0263043 A1* | 10/2013 | Sarbin | G06F 3/04842 |
| | | | 715/784 |
| 2016/0292164 A1* | 10/2016 | Kedia | G06F 16/21 |
| 2020/0052924 A1* | 2/2020 | Gimeno | H04L 12/2818 |

* cited by examiner

EMBEDDED PRODUCT, METHOD FOR DISPLAYING EMBEDDED PRODUCT INFORMATION AND COMPUTER READABLE MEDIUM

TECHNICAL FIELD

The present disclosure generally relates to the technical field of communication. More specifically, the present disclosure relates to an embedded product, a method of displaying information of the embedded product, and a computer readable medium.

BACKGROUND ART

Figure 1:
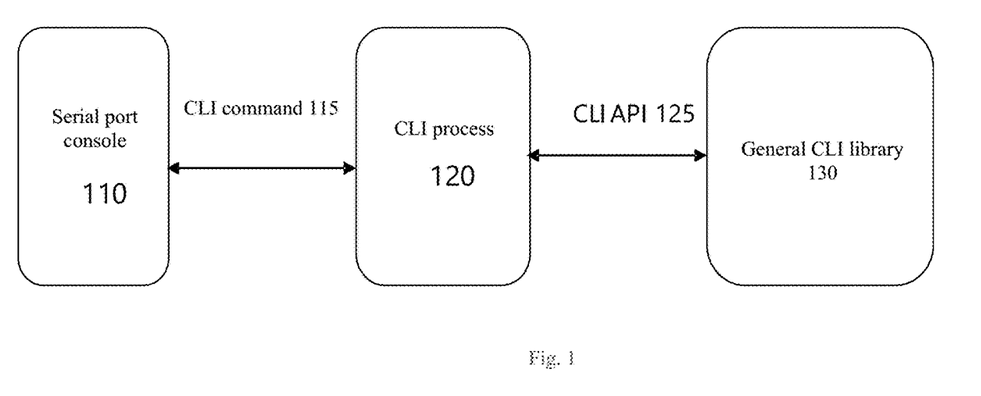
FIG. 1 shows a schematic diagram of the existing CLI method.

Traditionally, before embedded products such as modems go online, it is usually necessary to use the serial port console to obtain information for debugging. A command line interface (CLI) command is a common tool for embedded products (such as modems, routers, set-top boxes (STB), etc.), which is very important for debugging problems. The existing CLI method for modem debugging is shown in FIG. 1.

The user inputs the CLI command 115 through the serial port console 110, and the command is passed to the CLI process module 120, which calls the universal CLI library (LIB) 130 via the CLI application programming interface (API) 125 and obtains the corresponding information. Then, the information is returned via the CLI API 125 and displayed in the console 110 by the CLI process module 120.

For example, the user can input the command "/ rf ds" to obtain RF downstream signal information:

Console> rf
RF> ds.

Alternatively, the user can use the command "/ system last" to get the last reset reason log:

RF> /
Console> sys
System> last.

However, due to the serial port being disabled or other security reasons, the CLI method cannot be used in many customer sites. Therefore, without a serial port, it is very difficult to debug the modem before it goes online. For example, if there is a problem (especially an RF problem) before the modem goes online, it is difficult to debug this problem and bring the modem online without a serial port.

Accessing the customer graphical user interface (GUI) through a browser can also provide some modem information, but the information provided by the customer GUI is for customers, and the information displayed by it is usually not suitable for technicians to conduct debugging. For example, the customer GUI generally does not provide the detailed status page of cable modem (CM) including Wi-Fi driver version information and other details, RF signal page and reset log that are very important for debugging by technicians, because such information is meaningless to customers. Moreover, the customer GUI of modem is usually customized by the operator, so it is difficult for a technician to ask the operator to agree to add useful information for debugging.

In addition, the customer GUI is controlled by the operator, and its format and content will be different for different operator's customers. For example, in order to obtain a WI-FI configuration information, it may be necessary to click three buttons on different pages in one operator's customer GUI, while it may be necessary to click five buttons on different pages in another operator's customer GUI. That is, the methods of accessing the same information may be different for different customer GUIs.

In addition, there are many different operator customers, and the default user names and passwords of customer GUIs of these operator customers may be different, which is also controlled by the operator customers. For example, for customer A, the user name is Administrator and the password is aaa123, which is created using algorithm A; for customer B, the user name is Technician and the password is bbb888, which is created by using algorithm B. It is difficult for designers or technical support personnel to know all these usernames and passwords.

In addition to the customer GUI, the blinking of LED lights on the modem can also provide modem information. However, the information obtained only by reading the blinking of lights is limited and rough, which may not be useful for the debugging by technicians.

Therefore, there is a need for a way to obtain various debugging information of embedded products such as cable modems for debugging without a serial port.

SUMMARY OF THE INVENTION

In view of the above problems, the technical scheme of the present disclosure is proposed. By using the technical scheme of the present disclosure, even if the serial port is unavailable, the embedded product can be easily debugged. For example, for a modem, it is convenient to debug various problems encountered during the on-line process, such as RF signals, so as to get it online.

According to an aspect of the present disclosure, there is provided an embedded product comprising a general CLI library containing one or a plurality of CLI commands for the embedded product, wherein at least some commands in the general CLI library are mapped onto a debugging GUI and the embedded product further comprises: a memory having instructions stored thereon; a processor configured to execute instructions stored on the memory to cause the processor to perform the following operations: receiving a request for information about the embedded product in response to a click on a page element on the debugging GUI; obtaining the requested embedded product information from the general CLI library; and receiving the obtained information about the requested embedded product and displaying the information on the debugging GUI.

In some embodiments, the debugging GUI is assigned an entry address.

In some embodiments, the processor communicates with the general CLI library via CLI API.

In some embodiments, the embedded product comprises: at least one of modem, router and set top box (STB).

In some embodiments, the information includes: at least one of CM status, RF downstream signal, RF upstream signal and reset log.

In some embodiments, the debugging GUI is inaccessible after the embedded product is put on online.

In some embodiments, the CLI library is extendable by adding commands to the common CLI library or rewriting the common CLI library.

In some embodiments, the data obtained from the common CLI library is exported to the debugging GUI through output redirection technology.

According to another invention of the present disclosure, there is provided a method for displaying information of an embedded product comprising a general CLI library containing one or a plurality of CLI commands for the embedded product, wherein at least some commands in the general CLI library are mapped onto a debugging GUI, and the method comprises: receiving a request for information about the embedded product by a debugging GUI agent in response to a click on a page element on the debugging GUI; accessing a general CLI library by the debugging GUI agent to obtain the requested embedded product information from the general CLI library; and receiving the obtained information about the embedded product and displaying by the debugging GUI agent the information on the debugging GUI.

In some embodiments, the debugging GUI is assigned an entry address.

In some embodiments, the debugging GUI agent communicates with the general CLI library via CLI API.

In some embodiments, the embedded product comprises: at least one of modem, router and STB.

In some embodiments, the information includes: at least one of CM status, RF downstream signal, RF upstream signal and reset log.

In some embodiments, the debugging GUI is inaccessible after the embedded product is put on online.

In some embodiments, the CLI library is extendable by adding commands to the common CLI library or rewriting the common CLI library.

In some embodiments, the data obtained from the common CLI library is exported to the debugging GUI through output redirection technology.

According to another aspect of the present disclosure, there is provided a non-transitory computer readable medium for use with an embedded product, wherein the non-transitory computer readable medium has instructions stored thereon for executing the steps of the method according to the present disclosure by a processor.

According to another aspect of the present disclosure, there is provided an embedded product comprising means for executing the steps of the method according to the present disclosure.

According to another aspect of the present disclosure, there is provided a modem comprising a general CLI library and a debugging GUI agent, wherein the general CLI library contains one or a plurality of CLI commands for the modem, and at least some commands in the general CLI library are mapped onto the debugging GUI; and in response to a click on a page element on the debugging GUI, the debugging GUI agent receives a request for modem information, accesses the general CLI library to obtain the requested modem information from the general CLI library, receives the obtained information about the modem and displays it on the debugging GUI.

In some embodiments, the debugging GUI is assigned an entry address.

In some embodiments, the debugging GUI agent communicates with the general CLI library via CLI API.

In some embodiments, the modem information includes: at least one of CM status, RF downstream signal, RF upstream signal and reset log.

In some embodiments, the debugging GUI is inaccessible after the modem is put on online.

In some embodiments, the CLI library is extendable by adding commands to the common CLI library or rewriting the common CLI library.

In some embodiments, the data obtained from the common CLI library is exported to the debugging GUI through output redirection technology.

According to the embodiment of the present disclosure, by using the independent debugging GUI, as long as the local area network (LAN) is available, even if the serial port is unavailable, the embedded product can be easily debugged. This has many technical advantages.

The independent debugging GUI can clearly, in detail and accurately provide various information of embedded products for debugging purposes (e.g., for modems, RF upstream/downstream signal information, reset log, etc.), so as to facilitate debugging by technicians. This is what cannot be provided by flashing LED lights on the modem or the customer GUI.

The independent debugging GUI is controlled by technicians, not operators. An independent debugging GUI is separated from the customer GUI and is invisible to operators or ordinary users. Using an independent debugging GUI, pertinent to different products and the same information, it can provide all customers with a unified format and access method. Moreover, it can use a unified algorithm to create unified user names and passwords for all customers.

The design of independent debugging GUI is flexible, and the functions or modules can be continuously improved (for example, added or reduced) for different purposes according to the debugging needs of technicians.

It is very convenient to use the independent debugging GUI. Technicians can use PCs, laptops or even smart phones to debug modems.

In addition, most user CLIs are based on the operating system shell (for example, Linux shell). It is dangerous for illegal users to obtain access permission to the operating system shell. Using a separate debugging GUI can completely avoid this problem.

BRIEF DESCRIPTION OF THE DRAWINGS

For a better understanding of the present disclosure and to show how to implement the present disclosure, examples will be herein described with reference to the Attached Drawings, wherein.

DESCRIPTION OF EMBODIMENTS

The following detailed description is made with reference to the Attached Drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is limited by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

In order to avoid various problems in the prior art, the present disclosure proposes to use an independent debugging GUI for debugging embedded products such as modems, routers, and STBs. In this way, as long as a LAN is available, even if an serial port is unavailable, the embedded product can be easily debugged.

Next, the embodiment of the present disclosure will be described in detail by mainly taking a modem as an example. However, as those skilled in the art can understand, the present disclosure is equally applicable to other embedded products.

Figure 2:
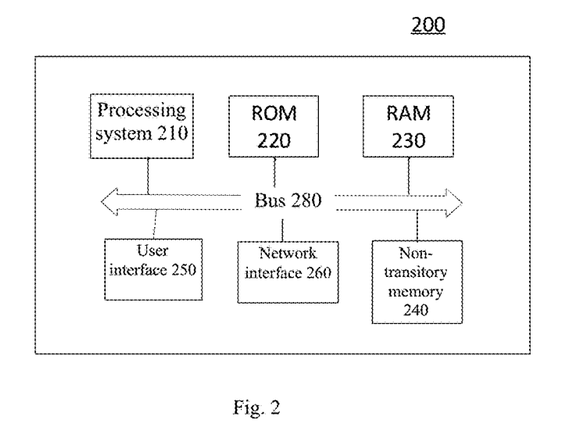
FIG. 2 shows a schematic diagram of a modem according to an embodiment of the present disclosure.

FIG. 2 shows a schematic diagram of a modem 200 according to an embodiment of the present disclosure. The modem 200 comprises a processing system 210, one or a plurality of memories used by the processing system 210 (e.g., read only memory (ROM) 220, random access memory (RAM) 230 and/or nonvolatile memory 240), a user interface 250, and a network interface 260. The above components are connected to each other through the bus 280.

The modem 200 may further comprise a general CLI library (not shown) containing one or a plurality of CLI commands for the modem 200. The modem 200 may further comprise a debugging GUI agent (not shown).

The processing system 210 controls the general operation of the modem 200. The processing system 210 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the modem 200 according to the embodiments described in the present disclosure. The processing system 210 may be various implementations of a digital circuit system, an analog circuit system, or a mixed signal (combination of analog and digital) circuit system that executes functions in a computing system. The processing system 110 may include, for example, an integrated circuit (IC), a part or circuit of a separate processor core, an entire processor core, an individual processor, a programmable hardware device such as a field programmable gate array (FPGA), and/or a system including a plurality of processors.

One or a plurality of memories include (but are not limited to) read-only memory (ROM) 220, random access memory (RAM) 230 and non-volatile memory 240, and dynamic random access memory (DRAM), static random access memory (SRAM), EPROM, EEPROM, flash memory, logic block of FPGA, hard disk or any other layers of memory hierarchy not shown in the figure.

As readily understandable by a skilled person, the general CLI library of the modem 200 can be stored on the memory 220 or non-volatile memory 240 and so on. Alternatively or additionally, the general CLI library can also be stored in some memory external to the modem 200.

In addition, for example, the nonvolatile memory 240 may include program instructions for controlling general functions and operations of the modem 200. According to an embodiment of the present disclosure, at least some commands in the general CLI library (for example, commands related to debugging or diagnosis) are mapped onto the debugging GUI. The above program instructions include, for example: program instructions for, in response to a click on a page element on the debugging GUI, receiving by a debugging GUI agent (i.e., the processor) a request for information about an embedded product (e.g., the modem); accessing the general CLI library by the debugging GUI agent to obtain the requested embedded product information from the general CLI library; and receiving the obtained information about the embedded product and displaying by the debugging GUI agent the information on the debugging GUI, as will be described in detail later.

The user interface 250 may include various devices that enable interaction between a technician and the modem 200, including (but not limited to) a serial interface, a USB interface, and the like.

The network interface 260 may comprise various types of network cards and circuit systems realized by software and/or hardware so that wireless protocols can be used for the communication with the outside, wherein the wireless protocols may be any IEEE 802.11 Wi-Fi protocol, Bluetooth protocol, Bluetooth low energy (BLE) or other short-distance protocol operating according to the wireless technological standards, for exchanging data in a short distance using any approved or unapproved frequency band (for example, citizens broadband radio service (CBRS) frequency band, 2.4-GHz band, 5-GHz band, 6-GHz band, or 60-GHz band), RF4CE protocol, ZigBee protocol, Z-Wave protocol, or IEEE 802.15.4 protocol.

Figure 3:
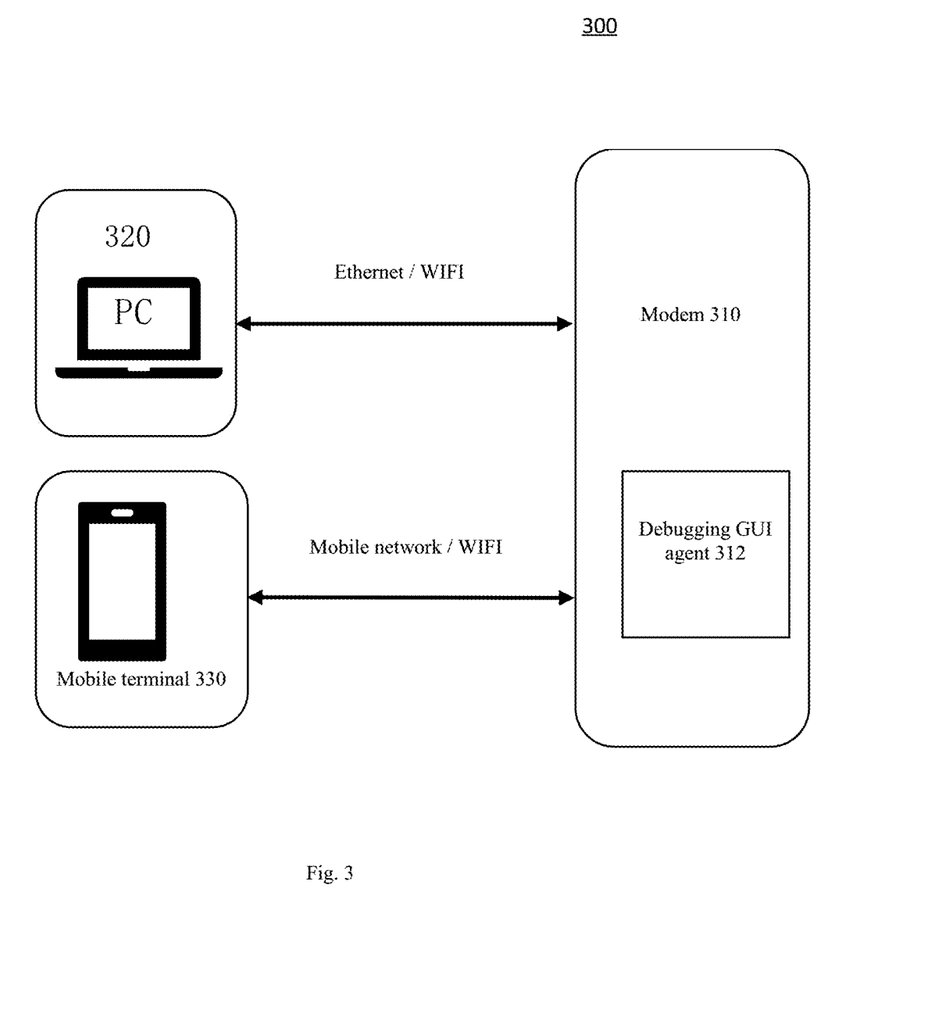
FIG. 3 shows a schematic diagram of debugging system according to an embodiment of the present disclosure.

FIG. 3 shows a schematic diagram of a system 300 for debugging according to an embodiment of the present disclosure. The system 300 includes a modem 310 (similar to the modem 200 in FIG. 2), and may also include a PC 320 or a mobile terminal 330 for debugging the modem 310. Those skilled in the art can understand that the modem 310 can be debugged using either the PC 320 or the mobile terminal 330, or both can be used for debugging at the same time as required. Here, for example, the PC 320 can communicate with the modem 310 through Ethernet and/or WI-FI, and the mobile terminal 330 can communicate with the modem 310 through mobile network and/or WI-FI.

The modem 310 may further include a debugging GUI agent module 312, which is used to invoke CLI commands in a general CLI library (not shown) to obtain information about the modem 310 from the CLI library for debugging, as described in detail later.

Figure 4:
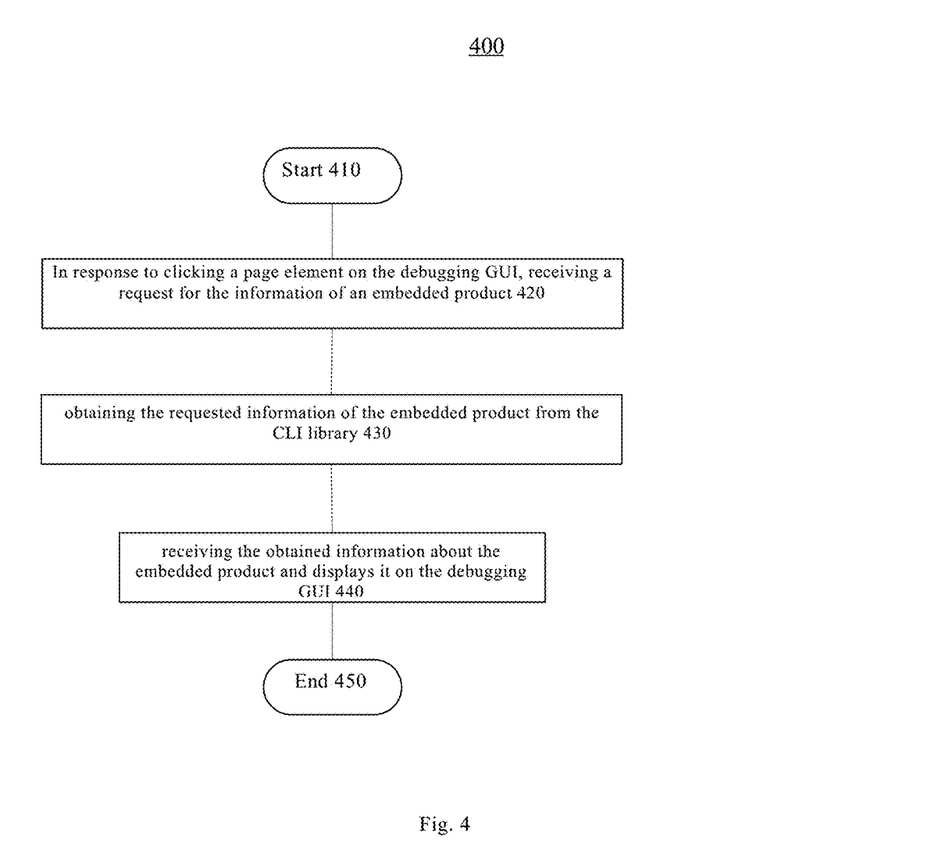
FIG. 4 shows a flowchart of a method according to an embodiment of the present disclosure.

FIG. 4 shows a flowchart of a method 400 for displaying information about a modem to facilitate debugging thereof according to an embodiment of the present disclosure. As mentioned above, the modem may include a general CLI library containing one or a plurality of CLI commands for the modem. The modem may also include a debugging GUI agent to be implemented by the processing system. At least some commands in the general CLI library (for example, commands related to debugging or diagnosis) are mapped onto the debugging GUI.

The method 400 of FIG. 4, which can be considered an algorithm implemented by the processing system, starts at step 410 and proceeds to step 420. In step 420, in response to a click by a user on a page element on the debugging GUI, a request for modem information is received by the debugging GUI agent. Next, in step 430, the debugging GUI agent sends a request to the general CLI library to obtain the requested modem information from the general CLI library. Then, in step 440, the obtained requested modem information is received by the debugging GUI agent and displayed on the debugging GUI. The method ends in step 450.

Figure 5:
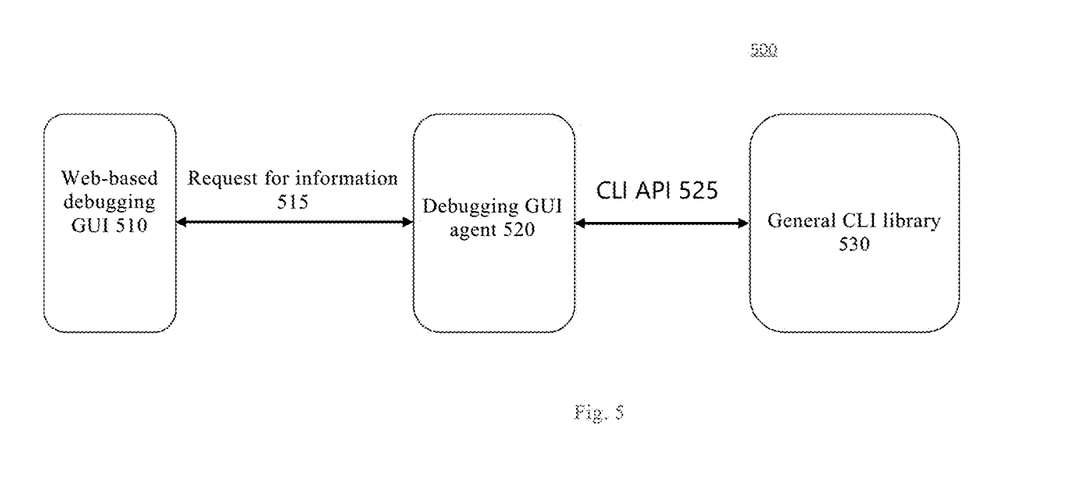
FIG. 5 shows a schematic diagram of an underlying structure for debugging a modem according to an embodiment of the present disclosure.

FIG. 5 shows a schematic diagram 500 for debugging a modem according to an embodiment of the present disclosure. The diagram 500 includes a web-based debugging GUI 510, a debugging GUI agent 520, and a general CLI library 530. The general CLI library 530 provides the required device information data for the debugging GUI 510.

Here, the web-based debugging GUI 510 is an independent debugging GUI designed for needs such as debugging, which is different from the client GUI. The debugging GUI 510 can display various useful information for engineers or designers to debug or diagnose the modem, as will be described in detail later. Those skilled in the art can understand that there are many ways to export the data obtained from the common CLI library to the debugging GUI, and those skilled in the art can choose the corresponding way to implement it according to their own needs. For example, in order to efficiently reuse the existing common CLI program library, the present disclosure may use the output redirection technology to redirect the data originally output to the serial port to the file without modifying the existing common CLI program library, and then the debugging GUI agent 520 transfers the data existing in the file to the debugging GUI 510.

In order to access the debugging GUI 510 in the browser, an entry address may be assigned for it, for example, http://192.168.0.1/debug/index.html. Those skilled in the art can understand that the address here is schematic, and other appropriate addresses can be specified for the debugging GUI 510 as needed.

By using an independent debugging GUI, it is separated from the customer GUI and invisible to ordinary users. With such an independent debugging GUI, all customers can be provided with a unified format and access method for different products and the same information, and a unified user name and password can be created for all customers by using a unified algorithm.

After the modem is put online, the technician can make the debugging GUI 510 inaccessible according to the design requirements. For example, the debugging GUI 510 can be hidden by assigning a new address thereto so that the original address is unavailable; or access to the debug GUI 510 may be redirected to a conventional client GUI interface. Therefore, when the user accesses the debugging GUI 510 after the modem is put online, for example, an error of "404" can be returned, indicating that the address is unavailable.

The debugging GUI agent 520 is preferably included in a modem (not shown), and is preferably implemented by an independent process. For example, when a user clicks a page element (e.g., button, tab, etc.) on the debugging GUI 510, the debugging GUI 510 sends a CLI command request corresponding to the page element to the debugging GUI agent 520 by a method similar to Linux Message Queue. The debugging GUI agent 520 is generally implemented by an independent process, and is linked with the general CLI library 530 to call the commands therein.

When the commands in the common CLI library 530 are called and the modem-related information is obtained, the debugging GUI agent 520 obtains the information through CLI API 525, and further transmits the information to the page for display through socket or shared memory.

In addition, as can be understood by those skilled in the art, the debugging GUI agent 520 can also be implemented by threads.

The general CLI library 530 may be a basic command library, including various commands required for debugging or diagnosing the modem to provide the required device information data for the debugging GUI 510.

According to the embodiment of the present disclosure, the general CLI library 530 can be extended. For example, when technicians need to add new modules or functions for debugging, they can add new commands to the CLI library 530 or rewrite the CLI library 530. According to the design requirements, the user can update the debugging GUI 510 synchronously to facilitate the use of the newly added or extended commands in the CLI library 530 in subsequent debugging.

According to the embodiment of the present invention, as described above, communication between the debugging GUI agent 520 and the general CLI library 530 can be performed through the CLI API 525. However, as can be understood by those skilled in the art, communication between the debugging GUI agent 520 and the general CLI library 530 can also be performed by socket or shared memory.

For example, when the user clicks a button on the web-based debugging GUI 510, the debugging GUI agent 520 receives a request message 515 corresponding to the button, and the request message 515 is a request for modem-related information. The debugging GUI agent 520 calls the command in the general CLI library 530 via the CLI API 525 to obtain the response result to the request. Then, the debugging GUI agent 520 receives the result via the CLI API 525 and displays the result on the web-based debugging GUI 510 for technicians to view.

As an example, some pages at the time of debugging the modem using the debugging GUI will be shown.

Figure 6:
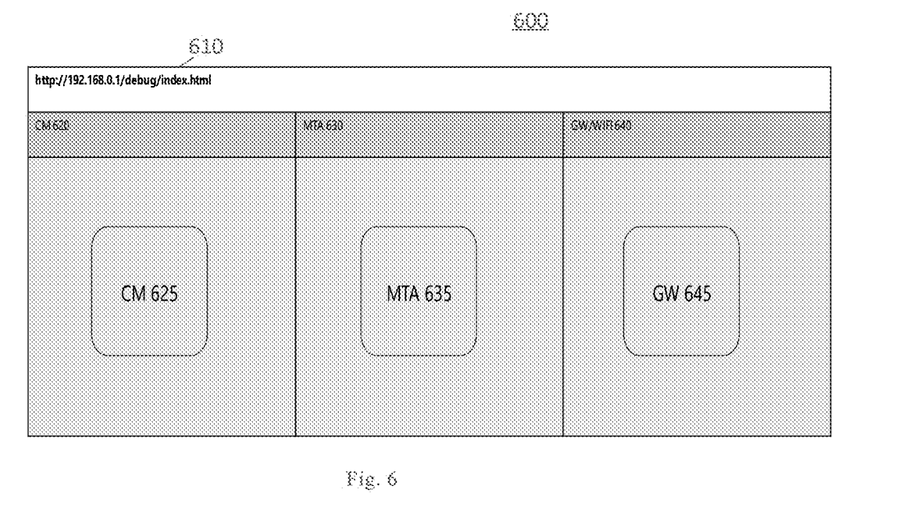
FIG. 6 shows a schematic diagram of each functional module of the debugging GUI according to an embodiment of the present disclosure.

For example, when entering the debugging GUI 510 by typing the debugging entry address, a debugging entry page 600 as shown in FIG. 6 will be displayed on the browser. At the top of the page 600 is a uniform resource locator (URL) line 610 indicating the address of the page, and at the bottom are three modules: a cable modem (CM) module 620, a multimedia terminal adapter (MTA) module 630, and a GW/WI-FI module 640. CM module 620 has a CM button 625, MTA module 630 has an MTA button 635, and GW/WI-FI module 640 has a GW button 645. Those skilled in the art can understand that the modules shown here are exemplary, and other modules can be displayed according to debugging needs.

Figure 7:
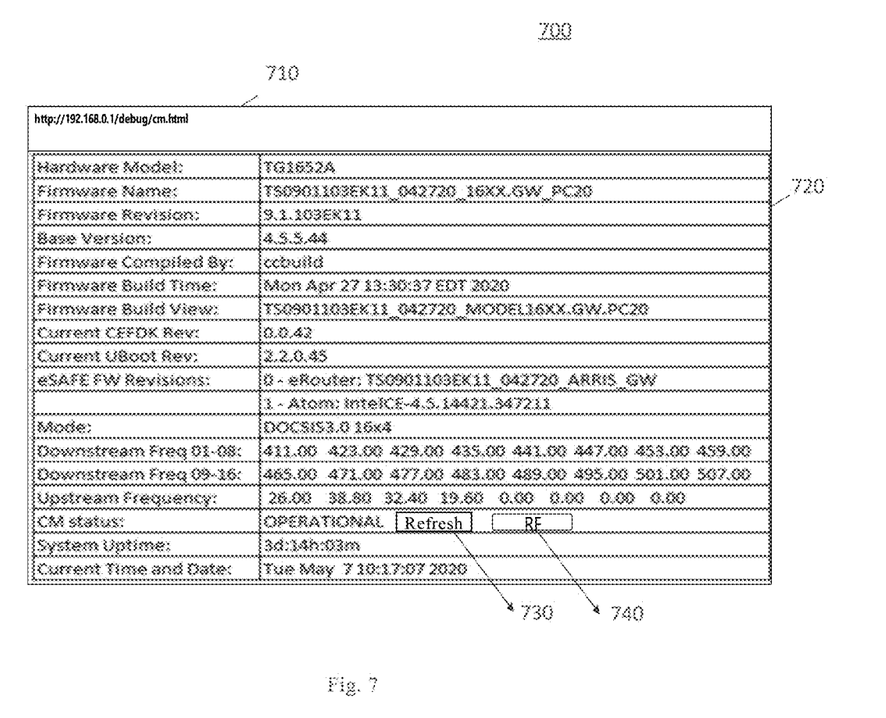
FIG. 7 shows a schematic diagram of the CM status page.

On the page shown in FIG. 6, if the user wants to know the whole information about CM, he can press the CM button 625, and the CM status page 400 shown in FIG. 7 will occur.

As shown on the page 700 in FIG. 7, the URL line 410 indicating the address of the page is at the top, and a list 720 of various items of information related to the current CM state is shown at the bottom. On the page 700 shown in FIG. 7, a "refresh" button 730 and an RF button 740 are also exemplarily displayed. For example, by clicking the "refresh" button 730, the currently displayed information list 720 can be refreshed to display the latest CM status information. By clicking the "RF" button 740, a page related to RF signals as shown in FIG. 8 or FIG. 9 will be displayed.

Figure 8:
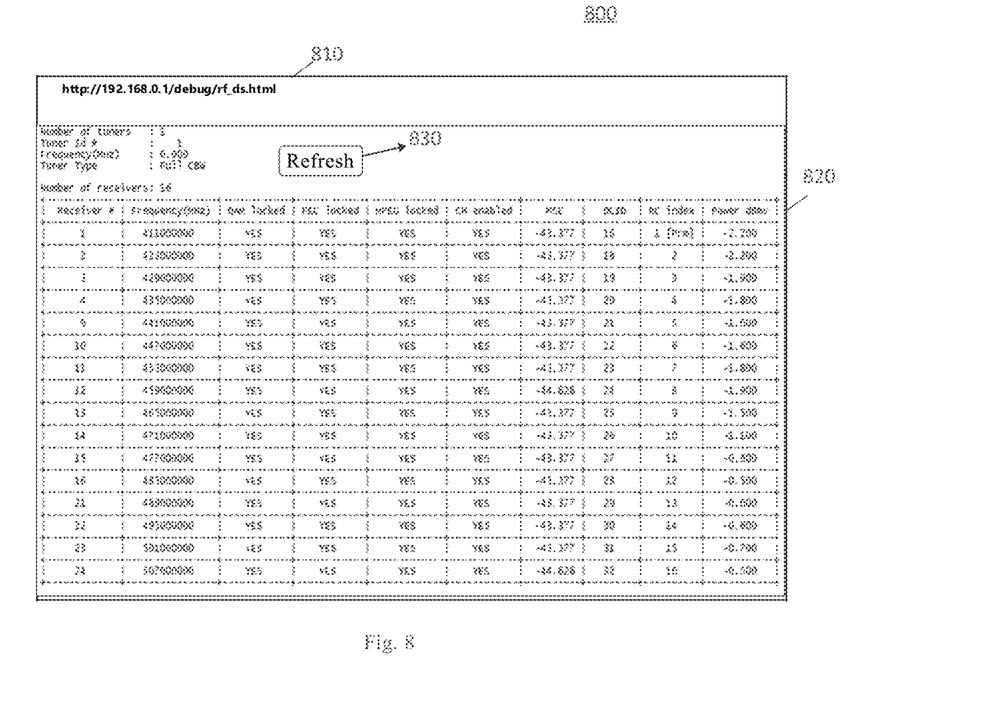
FIG. 8 shows a schematic diagram of a page for debugging RF downstream signal links.

FIG. 8 exemplarily shows a page 800 for debugging RF downstream signal links. On the page 800 shown in FIG. 8, the URL line 810 indicating the address of the page is at the top, and a list 820 of various items of information related to the current RF downstream signal is shown at the bottom. The page also shows a "refresh" button 830. By clicking this button 830, the currently displayed information list 820 can be refreshed to display the latest RF downstream signal information.

Figure 9:
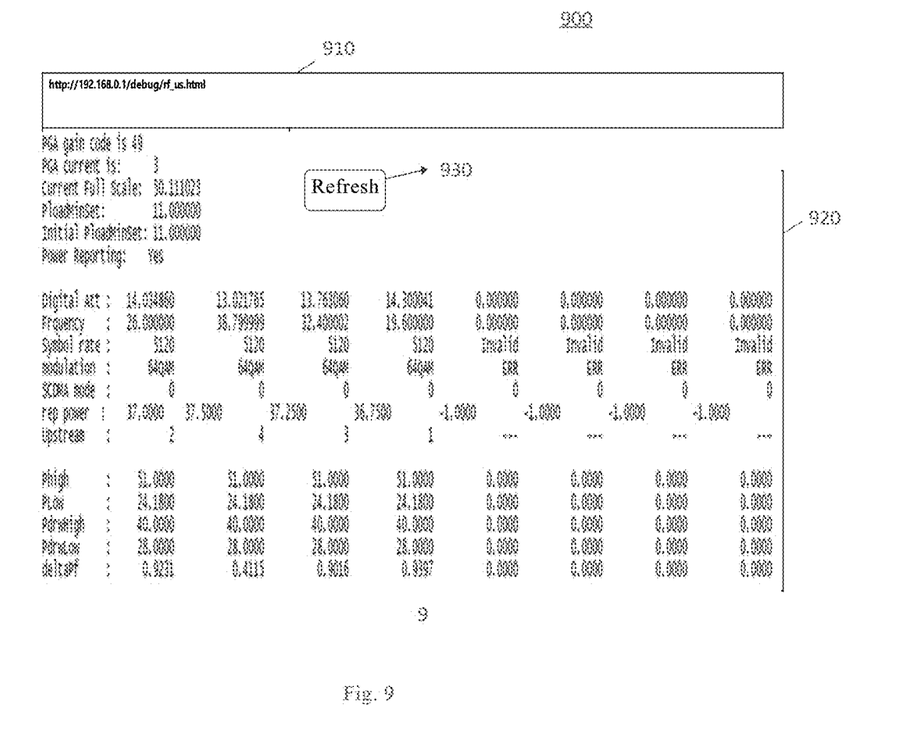
FIG. 9 shows a schematic diagram of a page for debugging RF upstream signal links.

FIG. 9 exemplarily shows a page 900 for debugging RF upstream signal links. On the page 900 shown in FIG. 9, the URL line 910 indicating the address of the page is at the top, and a list 920 of various items of information related to the current RF downstream signal is shown at the bottom. The page also shows a "refresh" button 930. By clicking this button 930, the currently displayed information list 920 can be refreshed to display the latest RF upstream signal information.

By looking at pages 800 and 900 as shown in FIGS. 8 and 9, engineers can clearly see various information of the modem RF signal link. Therefore, if there is a problem with certain RF information, it can be easily found, so as to carry out targeted debugging.

Figure 10:
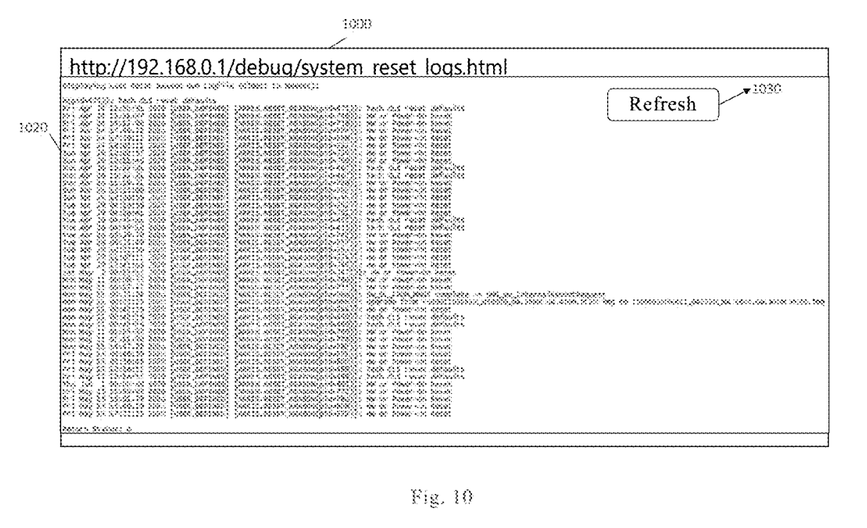
FIG. 10 shows a schematic diagram of a page indicating that the debugging GUI entry is unavailable.

In addition, a reset log page 1000 as shown in FIG. 10 may also be displayed. On the page 1000 shown in FIG. 10, the URL line 1010 indicating the address of the page is at the top, and the reset log 1020 is shown at the bottom. The page also shows a "refresh" button 1030. By clicking this button 1030, the currently displayed reset log list 1020 can be refreshed to display the latest reset log.

When all displayed information related to the modem is appropriate, the modem can be put online.

Figure 11:
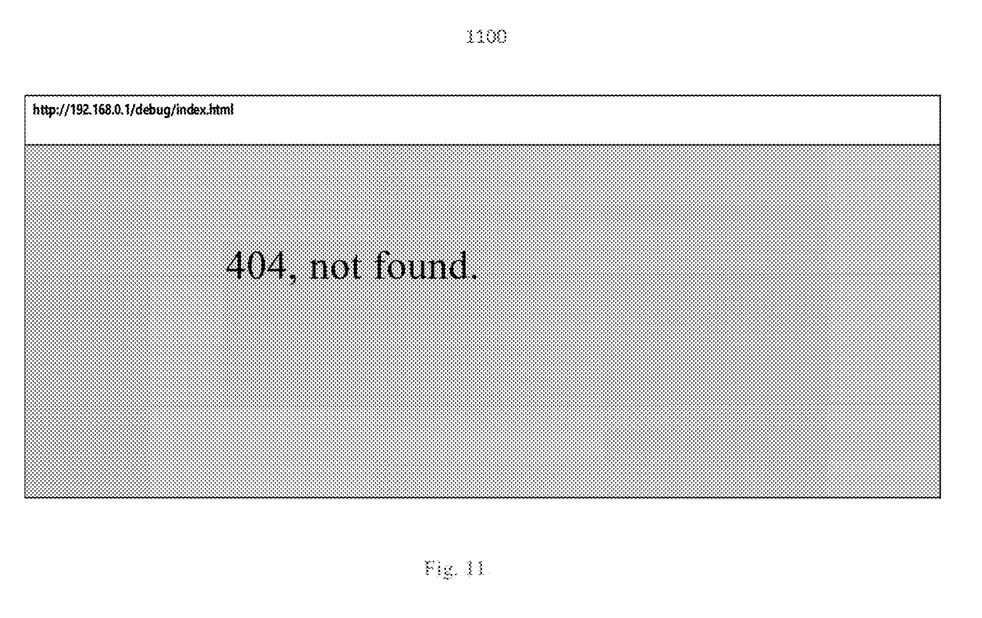
FIG. 11 shows a schematic diagram of reset log page.

After the modem is put online, the engineer can disable or hide the access to the debugging GUI entrance. For example, after the debugging GUI entry is hidden, a page 1100 as shown in FIG. 11 will be displayed to indicate that the debugging GUI entry is inaccessible.

Those skilled in the art can understand that the information in each page shown in FIGS. 7-11 is exemplary, and more or less information can be displayed as needed.

Figure 12:
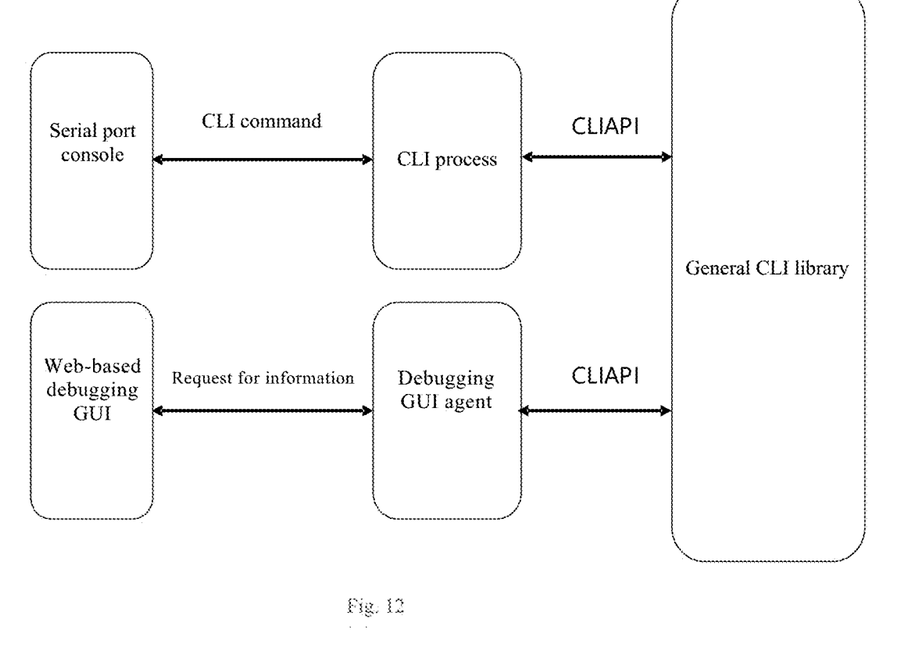
FIG. 12 shows a schematic diagram of debugging a modem by using both a serial port console and a debugging GUI together.

In addition, according to the embodiment of the present invention, when the serial port is also available, the serial port console and the web-based debugging GUI can be used together to call the modem information from the general CLI library, as shown in FIG. 12.

In FIG. 12, the way of obtaining information by using the serial port is similar to that shown in FIG. 1, and the way of obtaining information by using the debugging GUI is similar to that shown in FIG. 5, so it is not repeated here. The information obtained by using the serial port console and the debugging GUI is the same, but the ways of presenting the information are different. In the case of using a serial port, it is presented in the form of text in the console, while in the case of using a web-based debugging GUI, it is presented in the form of graphics in the interface (for example, it can include color change, highlighting, etc.), so that the presented content is more intuitive and vivid.

In addition, as can be understood by those skilled in the art, the modem of the present disclosure may be a cable modem (CM), a digital subscriber line (DSL) modem, or any other type of modem available in the market (e.g., wireless modem, etc.).

The embodiment of the present disclosure has been described above mainly by taking a modem as an example, but those skilled in the art can understand that the present disclosure is not only applicable to modems, but also applicable to other embedded products such as routers or STBs.

For other embedded products, the CLI commands can be output to the Web GUI in a similar way as described above for debugging purposes.

Figure 13:
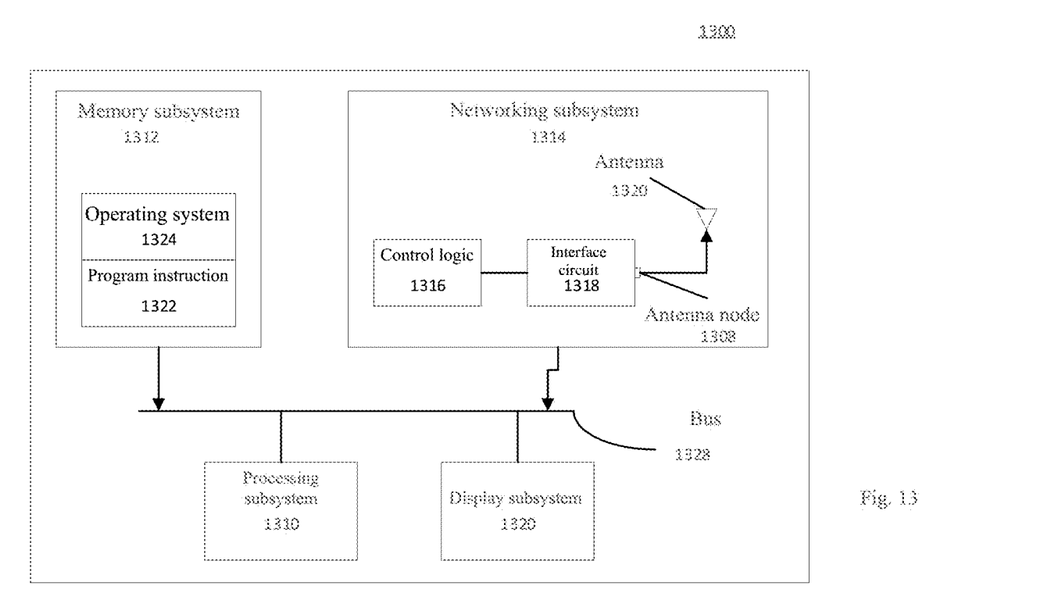
FIG. 13 is a block diagram showing the structure of an embedded product according to one embodiment of the present disclosure.

An embodiment of an embedded product according to the present disclosure will be described below, which can perform at least some operations in communication technology. FIG. 13 presents a block diagram illustrating an example of an embedded product 1300 according to an embodiment. The embedded product 1300 according to the present disclosure comprises a processing subsystem 1310, a memory subsystem 1312, and a networking subsystem 1315. The processing subsystem 1310 comprises one or a plurality of devices configured to perform computing operations. For example, the processing subsystem 1310 may include one or a plurality of microprocessors, ASICs, microcontrollers, programmable logic devices, graphics processing units (GPU) and/or one or a plurality of digital signal processors (DSP). All agents discussed herein are implemented using the disclosed hardware (e.g., processing system and memories).

The memory subsystem 1312 comprises one or a plurality of devices for storing data and/or instructions used for the processing subsystem 1310 and the networking subsystem 1314. For example, the memory subsystem 1312 may include a dynamic random access memory (DRAM), a static random access memory (SRAM), and/or other types of memory (sometimes collectively or individually referred to as "computer-readable storage medium"). In some embodiments, the instructions used in the memory subsystem 1312 of the processing subsystem 1310 comprise: One or a plurality of program modules or instruction sets (e.g., program instruction 1322 or operating system 1324), which can be executed by the processing subsystem 1310. It should be noted that one or a plurality of computer programs may constitute a computer program mechanism. In addition, an instruction in the various modules of the memory subsystem 1312 may be implemented by the following: advanced programming languages, object-oriented programming languages and/or assembly or machine languages. Furthermore, the programming language can be compiled or interpreted, for example, configurable or configured (used interchangeably in the discussion hereof) so as to be executed by the processing subsystem 1310.

In addition, the memory subsystem 1312 may comprise mechanism for controlling access to memory. In some embodiments, the memory subsystem 1312 includes a memory hierarchy, and the memory hierarchy includes one or a plurality of caches coupled to the memory in the embedded product 1300. In some of these embodiments, one or a plurality of the caches are located in the processing subsystem 1310.

In some embodiments, the memory subsystem 1312 is coupled to one or a plurality of high-capacity mass storage devices (not shown). For example, the memory subsystem 1312 may be coupled to a magnetic or optical driver, a solid state driver, or another type of mass storage device. In these embodiments, the electronic device 1300 may use the memory subsystem 1312 as a fast-access storage of frequently used data, while the mass storage device is used for storing infrequently used data.

The networking subsystem 1314 includes one or a plurality of devices that are configured to be coupled to and/or communicate over wired and/or wireless networks (i.e., to perform network operations), comprising: a control logic 1316, an interface circuit 1318, and one or a plurality of antennas 1320 (or antenna elements). (Although FIG. 13 includes one or a plurality of antennas 1320, in some embodiments, the embedded product 1300 includes one or a plurality of nodes that can be coupled to one or a plurality of antennas 1320, such as node 1308, for example, a pad. Therefore, the embedded product 1300 may or may not include one or a plurality of antennas 1320.) For example, the networking subsystem 1314 may include a Bluetooth networking system, cellular networking system (for example, 3G/4G/5G networks, such as UMTS and LTE), USB networking system, networking system based on the standards described in IEEE 802.11 (for example, Wi-Fi networking system), Ethernet networking system, and/or another networking system.

In some embodiments, the pattern shaper (such as reflector) in one or a plurality of antennas 1320 (or antenna elements) may be used to adapt or change the radiation pattern of the transmitting antenna of the embedded product 1300. The one or a plurality of antennas 1320 may be independently and selectively electrically coupled to the ground to direct the radiation pattern of the transmitting antenna to different directions. Therefore, if one or a plurality of antennas 1320 include N number of antenna radiation pattern shapers, the one or a plurality of antenna 1320 may have 2N of different antenna radiation pattern configurations. More generally, a given antenna radiation pattern may include the amplitude and/or phase of a signal specifying the direction of the main lobe or primary lobe of the given antenna radiation pattern, and the so-called "exclusion zone" or "exclusion region" (sometimes referred to as a "notch" or a "null"). Note that the exclusion zone of the given antenna radiation pattern includes a low-intensity region of the given antenna radiation pattern. Although the intensity is not necessarily zero in the exclusion zone, the intensity may be below a threshold such as 4 dB or lower than the peak gain of the given antenna radiation pattern. Therefore, a given antenna radiation pattern may include a local maximum value (e.g., main beam) that points the maximum value to the gain in the direction of the electronic device of interest, and one or a plurality of local minimum values that reduce the gain in the direction of other electronic devices of no-interest. In this way, a given antenna radiation pattern can be selected so that undesirable communication, such as communication with other electronic devices, can be avoided so as to reduce or eliminate adverse effects, such as interference or crosstalk.

The networking subsystem 1314 includes a processor, controller, radio device/antenna, socket/plug and/or other devices for coupling to each supported network system, communicating on each supported network system, and processing the data and events for each supported network system. Please note that sometimes the network for coupling to each network system, and the mechanisms used to communicate on that network, and process data and events on that network are collectively referred to as the "network interface" of the network system. Furthermore, in some embodiments, the "network" or "connection" between electronic devices does not yet exist. Therefore, the embedded product 1300 can use the mechanism in the networking subsystem 1314 to perform simple wireless communication between electronic devices, for example, sending frames and/or scanning frames sent by other electronic devices.

In the embedded product 1300, a bus 1328 is used to couple the processing subsystem 1310, the memory subsystem 1312, and the networking subsystem 1314 together. Bus 1328 may comprise electro, optic and/or electro-optic connections where subsystems can be used to communicate commands and data, and so on. Although only one bus 1328 is shown for clarity, different embodiments may comprise different numbers or configurations of electrical, optical, and/or electro-optical connections in the subsystems.

In some embodiments, the embedded product 1300 includes a display subsystem 1326 for showing information on a display device, which may include a display driver and a display, e.g., a liquid crystal display, a multi-touch screen, etc.

The embedded product 1300 may be (or may be included in) any electronic device having at least one network interface. For example, the embedded product 1300 can be (or can be included in): a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router, a switch, a communication device, an access point, a test device, and/or other electronic devices.

Although specific components are used to describe the embedded product 1300, in alternative embodiments, different components and/or subsystems may exist in the embedded product 1300. For example, the embedded product 1300 may include one or a plurality of additional processing subsystems, memory subsystems, networking subsystems, and/or display subsystems. In addition, one or a plurality of subsystems may not exist in the embedded product 1300. Furthermore, in some embodiments, the embedded product 1300 may include one or a plurality of additional subsystems not shown in FIG. 13. Also, although separate subsystems are shown in FIG. 13, in some embodiments, some or all of the given subsystems or components may be integrated into one or a plurality of other subsystems or components in the embedded product 1300. For example, in some embodiments, the program instruction 1322 is comprised in the operating system 1324, and/or the control logic 1316 is comprised in the interface circuit 1318.

Moreover, any combination of analog and/or digital circuits may be used to implement the circuits and components in the embedded product 1300, including: bipolar, PMOS and/or NMOS gates or transistors. In addition, the signals in these embodiments may include digital signals with approximate discrete values and/or analog signals with continuous values. In addition, the components and circuits may be single-ended or differential, and power supplies may be unipolar or bipolar.

Integrated circuits (sometimes referred to as "communication circuits" or "devices for communication") can achieve some or all of the functions of the networking subsystem 1314. The integrated circuit may include hardware and/or software mechanisms that are used to send wireless signals from the embedded product 1300 and receive signals from other electronic devices at the embedded product 1300. In addition to the mechanisms described herein, radio devices are generally known in the art, and therefore will not be elaborated. Generally, the networking subsystem 1314 and/or the integrated circuit may include any number of radio devices. Note that the radio devices in the multiple radios embodiment function in a similar manner to the single radio embodiment described.

In some embodiments, the networking subsystem 1314 and/or integrated circuit includes a configuration mechanism (e.g., one or a plurality of hardware and/or software mechanisms) that configures the radio device for transmission or reception on a given communication channel (e.g., a given carrier frequency). For example, in some embodiments, the configuration mechanism may be used to switch the radio from monitoring and/or transmitting on a given communication channel to monitoring and/or transmitting on a different communication channel. (It should be noted that "monitoring" as used herein includes receiving signals from other electronic devices and possibly performing one or a plurality of processing operations on the received signals.)

Although Wi-Fi and/or Ethernet communication protocols can be used as illustrative examples, in other embodiments, other communication protocols may be used, and more generally, communication technologies may be used. Therefore, communication technologies can be used in various network interfaces. In addition, although some operations in the aforementioned embodiments are implemented by hardware or software, in general, the operations in the aforementioned embodiments may be implemented in various configurations and frameworks. Therefore, some or all of the operations in the aforementioned embodiments may be executed by hardware, software, or both. For example, at least some operations in the communication technology can be implemented using the program instruction 1322, the operating system 1324 (e.g., a driver for the interface circuit 1318), or firmware in the interface circuit 1318. Alternatively or in addition, at least some operations in the communication technology may be implemented at physical layer, e.g., hardware in the interface circuit 1318.

The present disclosure may be implemented as any combination of devices, systems, integrated circuits, and computer programs on non-transitory computer-readable media. One or a plurality of processors can be implemented as an integrated circuit (IC), an application specific integrated circuit (ASIC) or a large-scale integrated circuit (LSI), a system LSI, or a super LSI or super LSI component that performs part or all of the functions described in this disclosure.

The present disclosure includes the use of software, applications, computer programs, or algorithms. Software, application programs, computer programs or algorithms can be stored on a non-transitory computer readable medium, so that a computer with one or a plurality of processors can execute said steps and the steps described in the drawings. For example, one or a plurality of memories store software or algorithms by executable instructions, and one or a plurality of processors can associate the execution of a set of instructions of the software or algorithms to execute operations in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLD), including computer-readable media that receive machine instructions as computer-readable signals.

For example, the computer-readable medium may be any dynamic random access memory (DRAM), random access memory (RAM), read only memory (ROM), electrically erasable programmable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned implementation technologies may be used to complete the implementation of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the Attached Drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. An embedded product comprising:
   a general command line interface (CLI) library containing one or more CLI commands for debugging, diagnosing, or both the embedded product, wherein at least one of the one or more CLI commands in the general CLI library are mapped to a debugging graphical user interface (GUI) of a browser;
   a memory having instructions stored thereon;
   a processor configured to execute the instructions stored on the memory to cause the processor to carry out the following operations:
   receiving a request for information about the embedded product in response to a click on a page element on the debugging GUI;
   sending, by a debugging GUI agent of the embedded product, the at least one of the one or more CLI commands that corresponds to the click on the page element to the CLI library;
   obtaining, by the debugging GUI agent, the requested embedded product information from the general CLI library;
   and transmitting the information to a page of the debugging GUI for display on the debugging GUI.

2. The embedded product according to claim 1, wherein the debugging GUI is assigned an entry address.

3. The embedded product according to claim 1, wherein the debugging GUI agent communicates with the general CLI library via CLI application programming interface (API).

4. The embedded product according to claim 1, wherein the embedded product comprises:
at least one of modem, router and set top box (STB).

5. The embedded product according to claim 4, wherein the information comprises:
at least one of cable modem (CM) status, radio frequency (RF) downstream signal, RF upstream signal and reset log.

6. The embedded product according to claim 4, wherein the debugging GUI is inaccessible after the embedded product is put online.

7. The embedded product according to claim 1, wherein the general CLI library is extendable by adding commands to the general CLI library or rewriting the general CLI library.

8. The embedded product according to claim 1, wherein the information obtained from the general CLI library is redirected to a file without modifying the general CLI library and data in the file is transferred to the debugging GUI using output redirection technology.

9. A method, for displaying information of an embedded product, comprising:
receiving a request for information about the embedded product by a debugging graphical user interface (GUI) agent in response to a click on a page element on a debugging GUI of a browser, wherein a general command line interface (CLI) library of the embedded product contains one or more CLI commands for debugging, diagnosing, or both the embedded product, and wherein at least one of the one or more CLI commands in the general CLI library are mapped to the debugging GUI;
sending, by the debugging GUI agent of the embedded product, the at least one of the one or more CLI commands that corresponds to the click on the page element to the CLI library;
obtaining, by the debugging GUI agent, the requested embedded product information from the general CLI library;
and transmitting by the debugging GUI agent the information to a page of the debugging GUI for display on the debugging GUI.

10. The method according to claim 9, wherein the debugging GUI is assigned an entry address.

11. The method according to claim 9, wherein the debugging GUI agent communicates with the general CLI library via CLI application programming interface (API).

12. The method according to claim 9, wherein the embedded product comprises:
at least one of modem, router and set top box (STB).

13. The method according to claim 11, wherein the information comprises:
at least one of cable modem (CM) status, radio frequency (RF) downstream signal, RF upstream signal and reset log.

14. The method according to claim 11, wherein the debugging GUI is inaccessible after the embedded product is put online.

15. The method according to claim 9, wherein the general CLI library is extendable by adding commands to the general CLI library or rewriting the general CLI library.

16. The method according to claim 9, wherein the information obtained from the general CLI library is redirected to a file without modifying the general CLI library and data in the file is transferred to the debugging GUI through output redirection technology.

17. A modem comprising:
a general command line interface (CLI) library;
a debugging graphical user interface (GUI) agent, wherein the general CLI library comprises one or more CLI commands for debugging, diagnosing, or both the modem, and wherein at least one of the one or more CLI commands in the general CLI library are mapped onto a debugging GUI;
and in response to a click on a page element on the debugging GUI of a browser, the debugging GUI agent receives a request for modem information;
the debugging GUI agent sends the at least one of the one or more CLI commands that corresponds to the click on the page element to the CLI library;
the debugging GUI agent obtains the requested modem information from the general CLI library;
and the debugging GUI agent receives the obtained information about the modem and transmits the information to a page of the debugging GUI for display on the debugging GUI.

18. The modem according to claim 17, wherein at least one of:
the debugging GUI agent communicates with the general CLI library via CLI application programming interface (API);
the general CLI library is extendable by adding commands to the general CLI library or rewriting the general CLI library;
and the information obtained from the general CLI library is redirected to a file without modifying the general CLI library and data in the file is transferred to the debugging GUI through output redirection technology.

19. The modem according to claim 17, wherein the modem information comprises:
at least one of cable modem (CM) status, radio frequency (RF) downstream signal, RF upstream signal and reset log.

20. The modem according to claim 17, wherein the debugging GUI is inaccessible after the modem is put online.

* * * * *